US010066695B2

(12) United States Patent
Ueki (10) Patent No.: US 10,066,695 B2
(45) Date of Patent: Sep. 4, 2018

(54) VIBRATION DAMPING DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/034,257

(22) PCT Filed: Sep. 1, 2014

(86) PCT No.: PCT/JP2014/072886
§ 371 (c)(1),
(2) Date: May 4, 2016

(87) PCT Pub. No.: WO2015/068449
PCT Pub. Date: May 14, 2015

(65) Prior Publication Data
US 2016/0281814 A1    Sep. 29, 2016

(30) Foreign Application Priority Data

Nov. 11, 2013 (JP) ................................. 2013-233281

(51) Int. Cl.
*F16F 13/10* (2006.01)
*F16F 9/34* (2006.01)
*F16F 13/08* (2006.01)

(52) U.S. Cl.
CPC ................ *F16F 9/34* (2013.01); *F16F 13/08* (2013.01); *F16F 13/107* (2013.01)

(58) Field of Classification Search
CPC ...... F16F 9/05; F16F 9/437; F16F 9/50; F16F 9/34; F16F 13/08; F16F 13/002; F16F 13/105; F16F 13/107; F16F 2230/24
(Continued)

(56) References Cited

U.S. PATENT DOCUMENTS 4,483,521 A * 11/1984 Kakimoto ............. F16F 13/107
                                                  267/140.13
4,573,656 A *  3/1986 Yoshida ................ F16F 13/107
                                                     248/562
(Continued)

FOREIGN PATENT DOCUMENTS

CN     1676968 A    10/2005
CN     1932329 A     3/2007
(Continued)

OTHER PUBLICATIONS

International Search Report for PCT/JP2014/072886 dated Oct. 7, 2014 [PCT/ISA/210].

*Primary Examiner* — Thomas W Irvin
(74) *Attorney, Agent, or Firm* — Sughrue Mion, PLLC (57) ABSTRACT

A vibration damping device (10) includes a first attachment member (11) and a second attachment member (12), an elastic body (13) configured to couple the attachment members (11 and 12) to each other, and partition members (16) configured to partition a liquid chamber in the first attachment member (11) in which a liquid (L) is sealed into the first liquid chamber (14) and the second liquid chamber (15). A communicating passage (30) configured to communicate the first liquid chamber (14) with the second liquid chamber (15) is provided in the partition members (16). Flow-changing protrusions (31 and 32) protruding inward in a radial direction of the communicating passage (30) and configured to change a flow of the liquid flowing in the communicating passage (30) in an axial direction of the communicating passage (30) are provided in an inner circumferential surface of the communicating passage (30). The communicating passage (30) and the flow-changing protrusions (31 and 32) are formed symmetrically with respect to an axis (O) of the communicating passage (30) when viewed in a longitudinal cross section passing through (Continued)

the axis (O) and the flow-changing protrusions (31 and 32). Projecting ends of the flow-changing protrusions (31 and 32) form inner circumferential edges of passing holes (31c and 32c) which are open toward both sides in the axial direction. According to the vibration damping device (10), occurrence of abnormal noise is suppressed while product features are secured so that simplification of a structure and facilitation of manufacture can be achieved.

8 Claims, 7 Drawing Sheets

(58) Field of Classification Search
USPC .......................................... 267/140.13, 140.11
See application file for complete search history.

(56) References Cited

U.S. PATENT DOCUMENTS

| | | | | | |
|---|---|---|---|---|---|
| 4,618,128 | A | * | 10/1986 | Hartel | F16F 13/107 188/320 |
| 4,630,808 | A | * | 12/1986 | Ushijima | F16F 13/10 267/140.13 |
| 4,651,980 | A | * | 3/1987 | Morita | F16F 13/106 267/140.13 |
| 4,657,219 | A | * | 4/1987 | Kakimoto | F16F 13/105 248/562 |
| 4,676,489 | A | * | 6/1987 | Hofmann | F16F 13/107 267/122 |
| 4,739,962 | A | * | 4/1988 | Morita | F16F 9/34 267/140.13 |
| 4,739,978 | A | * | 4/1988 | Bodin | F16F 13/107 188/320 |
| 4,795,140 | A | * | 1/1989 | Orikawa | F16F 13/24 267/140.13 |
| 4,903,951 | A | | 2/1990 | Miyamoto et al. | |
| 5,645,138 | A | * | 7/1997 | Tajima | F16F 13/16 180/300 |
| 5,823,515 | A | * | 10/1998 | Takehara | F02B 75/34 267/140.13 |
| 2005/0206056 | A1 | | 9/2005 | Maeno et al. | |
| 2016/0131219 | A1 | * | 5/2016 | Ueki | F16F 13/107 267/140.13 |
| 2016/0298716 | A1 | * | 10/2016 | Ueki | F16F 13/107 |
| 2017/0023089 | A1 | * | 1/2017 | Ueki | F16F 13/105 |
| 2017/0023090 | A1 | * | 1/2017 | Ueki | F16F 13/10 |
| 2017/0023091 | A1 | * | 1/2017 | Ueki | F16F 13/10 |
| 2017/0030428 | A1 | * | 2/2017 | Ueki | B60K 5/1208 |
| 2017/0037924 | A1 | * | 2/2017 | Ueki | F16F 13/10 |
| 2017/0045108 | A1 | * | 2/2017 | Ueki | F16F 13/10 |
| 2017/0167564 | A1 | * | 6/2017 | Ueki | F16F 13/107 |

FOREIGN PATENT DOCUMENTS

| | | |
|---|---|---|
| CN | 102734375 A | 10/2012 |
| EP | 0132404 A2 | 1/1985 |
| JP | 57-179448 A | 11/1982 |
| JP | 58-18143 U | 2/1983 |
| JP | 2007-120598 A | 5/2007 |
| JP | 2009-150451 A | 7/2009 |
| JP | 2009-236143 A | 10/2009 |
| JP | 2012-172736 A | 9/2012 |

* cited by examiner

VIBRATION DAMPING DEVICE

TECHNICAL FIELD

The present invention relates to a vibration damping device which is applied to, for example, vehicles, industrial machines, etc. and absorbs and attenuates vibrations of vibration-generating parts such as engines.

This application is a National Stage of International Application No. PCT/JP2014/072886, filed on Sep. 1, 2014, which claims priority from Japanese Patent Application No. 2013-233281, filed Nov. 11, 2013, the content of which is incorporated herein by reference.

BACKGROUND ART

A constitution disclosed in, for example, Patent Document 1 is known as such a type of vibration damping device. Such a vibration damping device includes a first tubular attachment member coupled to one of a vibration-generating part and a vibration-receiving part, a second attachment coupled to the other part, an elastic body coupling the attachment members to each other, and partition members configured to partition a liquid chamber in the first attachment member in which a liquid is sealed in a first liquid chamber and a second liquid chamber. The vibration damping device further includes a first restriction passage and a second restriction passage which communicate the liquid chambers with each other, a cylinder chamber provided between the liquid chambers, and a plunger member arranged movably between an open position and a closed position in the cylinder chamber.

A plurality of types of vibrations with different frequencies such as, for example, an idle vibration and a shake vibration are input to the vibration damping device. Resonance frequencies of the first restriction passage and the second restriction passage are set (tuned) to frequencies of the different types of vibrations in the vibration damping device. The plunger member is moved between the open position and the closed position according to frequencies of the input vibrations so that a restriction passage through which the liquid flows is switched between the first restriction passage and the second restriction passage.

CITATION LIST

Patent Document

[Patent Document 1]
Japanese Unexamined Patent Application, First Publication No. 2007-120598

SUMMARY OF INVENTION

Technical Problem

However, there is room for improvement in terms of suppression of abnormal noise occurring when the plunger member is moved, simplification of a structure, and facilitation of manufacture in the conventional vibration damping device.

Also, in the conventional vibration damping device, when unintentional vibrations such as, for example, minute vibrations whose frequency is higher than a resonance frequency of the restriction passage and amplitude is remarkably small are input, a dynamic spring constant increases due to clogging of the restriction passage, etc. As a result, this may influence product features of the vibration damping device such as, for example, ride comfort of vehicles. Note that the resonance frequency of the restriction passage is determined by a path length, a cross-sectional area, etc. of the restriction passage.

The present invention was made in view of the above-described circumstances, and an object of the present invention is to provide a vibration damping device in which occurrence of abnormal noise is suppressed while product features are secured so that simplification of a structure and facilitation of manufacture can be achieved.

Solution to Problem

In order to accomplish the object, the present invention suggests the following means.

According to the present invention, a vibration damping device is provided, including a first tubular attachment member coupled to one of a vibration-generating part and a vibration-receiving part and a second attachment member coupled to the other part, an elastic body configured to couple the attachment members to each other, and partition members configured to partition a liquid chamber in the first attachment member in which a liquid is sealed into a first liquid chamber and a second liquid chamber. At least one of the first liquid chamber and the second liquid chamber has the elastic body as a portion of a wall surface. A communicating passage configured to communicate the first liquid chamber with the second liquid chamber is provided in the partition members. Flow-changing protrusions protruding inward in a radial direction of the communicating passage and configured to change a flow of the liquid flowing in the communicating passage in an axial direction of the communicating passage are provided in an inner circumferential surface of the communicating passage. The communicating passage and the flow-changing protrusions are formed symmetrically with respect to an axis of the communicating passage when viewed in a longitudinal cross section passing through the axis and the flow-changing protrusions. Projecting ends of the flow-changing protrusions form inner circumferential edges of passing holes which are open toward both sides in the axial direction.

In the present invention, when the vibrations are input, the liquid flows in the axial direction via the communicating passage between the first liquid chamber and the second liquid chamber. When the liquid reaches portions in the communicating passage at which the flow-changing protrusions are positioned, the liquid flowing along the outside in the radial direction in the communicating passage among the liquid flowing through the communicating passage flows along surfaces of the flow-changing protrusions from base end sides toward tip sides so that the flow is changed inward in the radial direction. Also, the liquid flowing along the inside in the radial direction in the communicating passage among the liquid flowing through the communicating passage is caused to flow through the communicating passage in the axial direction.

In this case, when the flow rate of the liquid increases, pressure loss of the liquid is increased due to, for example, energy loss occurring when the liquid caused to pass through the passing holes in the axial direction and the liquid whose flow is changed by the flow-changing protrusions collide with each other, etc., thereby absorbing and attenuating the vibrations.

Here, the communicating passage and the flow-changing protrusions are formed symmetrically with respect to the axis when viewed in the longitudinal cross section in the vibration damping device. Therefore, the flow of the liquid flowing along portions at both outer sides in the radial direction when viewed in the longitudinal cross section is changed symmetrically with respect to the axis by the flow-changing protrusion. Since the liquid whose flow is changed in this way collides with the liquid caused to pass through the passing holes in the axial direction from both outer sides in the radial direction, the pressure loss of the liquid is effectively increased.

On the other hand, if the flow rate of the liquid is slow, the pressure loss of the liquid due to the above-described collision of the liquid is suppressed, and the liquid smoothly flows in the communicating passage, thereby suppressing an increase of the dynamic spring constant.

According to the vibration damping device, the pressure loss of the liquid is increased according to the flow rate of the liquid flowing in the communicating passage so that the vibration can be absorbed and attenuated. As a result, for example, when normal vibrations such as an idle vibration and a shake vibration are input, the vibrations can be absorbed and attenuated irrespective of frequencies of the vibrations. Therefore, occurrence of abnormal noise is suppressed while a plurality of types of vibrations with different frequencies are absorbed and attenuated so that simplification of a structure and facilitation of manufacture can be achieved.

The liquid smoothly flows in the communicating passage while the pressure loss of the liquid with a slow flow rate is suppressed, thereby suppressing the increase of the dynamic spring constant. Therefore, for example, when a flow rate of the liquid is slower than that when normal vibrations are input such as when unintentional vibrations such as minute vibrations higher in frequency and remarkably smaller in amplitude than the normal vibrations are input, the increase of the dynamic spring constant can be suppressed so that product features of the vibration damping device can be easily secured.

Also, the flow-changing protrusions may partition an inside of the communicating passage into flow-changing spaces formed between the flow-changing protrusions and the inner circumferential surface of the communicating passage and configured to change a flow of the liquid flowing thereinto and passing spaces having the passing holes and through which the liquid flowing thereinto passes.

In this case, when the liquid flowing in the communicating passage reaches portions at which the flow-changing protrusions are positioned in the communicating passage, the liquid flowing along the outside in the radial direction in the communicating passage among the liquid flows into the flow-changing spaces and flows toward sides of the projecting ends of the flow-changing protrusions along surfaces of the flow-changing protrusions, thereby changing the flow in the radial direction. Also, the liquid flowing along the inside in the radial direction in the communicating passage passes through the passing holes, flows into the passing spaces, and passes through the passing spaces in the axial direction.

According to the vibration damping device, since the flow-changing protrusions partition the inside of the communicating passage into the flow-changing spaces and the passing spaces, the flow-changing protrusions can suppress and accurately change the flow of the liquid flowing into the flow-changing spaces from an influence of the liquid passing through the passing spaces. Therefore, when the flow rate of the liquid increases, the pressure loss of the liquid can be reliably increased.

Also, the flow-changing protrusions may be formed in tubular shapes which extend in the axial direction and in which openings of sides of projecting ends are the passing holes, and the flow-changing spaces may be formed between outer circumferential surfaces of the flow-changing protrusions and the inner circumferential surface of the communicating passage, and the passing spaces may be formed by inner circumferential surfaces of the flow-changing protrusions.

In this case, since the flow-changing spaces are formed between the outer circumferential surfaces of the flow-changing protrusions and the inner circumferential surface of the communicating passage, the flow-changing spaces can be formed throughout the entire circumference in the circumferential direction of the communicating passage. Thus, the flow of the liquid flowing along the outside in the radial direction in the communicating passage among the liquid flowing through the communicating passage can be changed throughout the entire circumference in the circumferential direction. Therefore, when the flow rate of the liquid increases, the pressure loss of the liquid can be more reliably increased.

Also, since the passing spaces are formed by the inner circumferential surfaces of the flow-changing protrusions, the passing spaces can be open toward both sides in the axial direction. Thus, the liquid flowing in the passing spaces can flow in the passing spaces in the axial direction so that the liquid in the passing spaces can flow smoothly.

Also, diameters of the outer circumferential surfaces of the flow-changing protrusions may be gradually decreased from base ends toward projecting ends.

In this case, the diameters of the outer circumferential surfaces of the flow-changing protrusions are gradually decreased from the base ends toward the projecting ends. Therefore, the flow of the liquid flowing into the flow-changing spaces is changed to flow along the outer circumferential surfaces of the flow-changing protrusions so that the liquid is turned about a circumference as a turning axis extending in the circumferential direction so that a direction of the flow of the liquid can be reversed in the axial direction. Thus, the pressure loss of the liquid occurring when the liquid caused to pass through the passing holes in the axial direction collides with the liquid whose flow is changed by the flow-changing protrusions can be more reliably increased.

Also, if the diameters of the inner circumferential surfaces of the flow-changing protrusions are also gradually decreased from the base ends toward the projecting ends, the diameters of both of the flow-changing protrusions are gradually decreased from the base ends toward the projecting ends. In this case, when the liquid flowing from the passing holes into the passing spaces flows in the passing spaces in the axial direction, the energy loss due to friction between the liquid and the inner circumferential surfaces of the flow-changing protrusions can be suppressed so that the liquid in the passing spaces can flow more smoothly.

Also, a first flow-changing protrusion in which the openings on the sides of the projecting ends faces a side of the first liquid chamber in the axial direction and a second flow-changing protrusion in which the openings on the sides of the projecting ends faces a side of the second liquid chamber in the axial direction may be provided as the flow-changing protrusions.

In this case, the first flow-changing protrusion and the second flow-changing protrusion are provided as the flow-changing protrusions. Therefore, the flow of the liquid flowing from the first liquid chamber to the second liquid chamber is changed by the first flow-changing protrusion so that the pressure loss of the liquid is increased. In addition, even when the flow of the liquid flowing from the second liquid chamber to the first liquid chamber is changed by the second flow-changing protrusion, the pressure loss of the liquid can be increased. Thus, the vibrations can be effectively absorbed and attenuated.

Advantageous Effects of Invention

According to the vibration damping device of the present invention, occurrence of abnormal noise is suppressed while product features are secured so that simplification of a structure and facilitation of manufacture can be achieved.

DESCRIPTION OF EMBODIMENTS

First Embodiment

Hereinafter, a first embodiment of a vibration damping device according to the present invention will be described in detail with reference to FIGS. 1 to 3.

Figure 1:
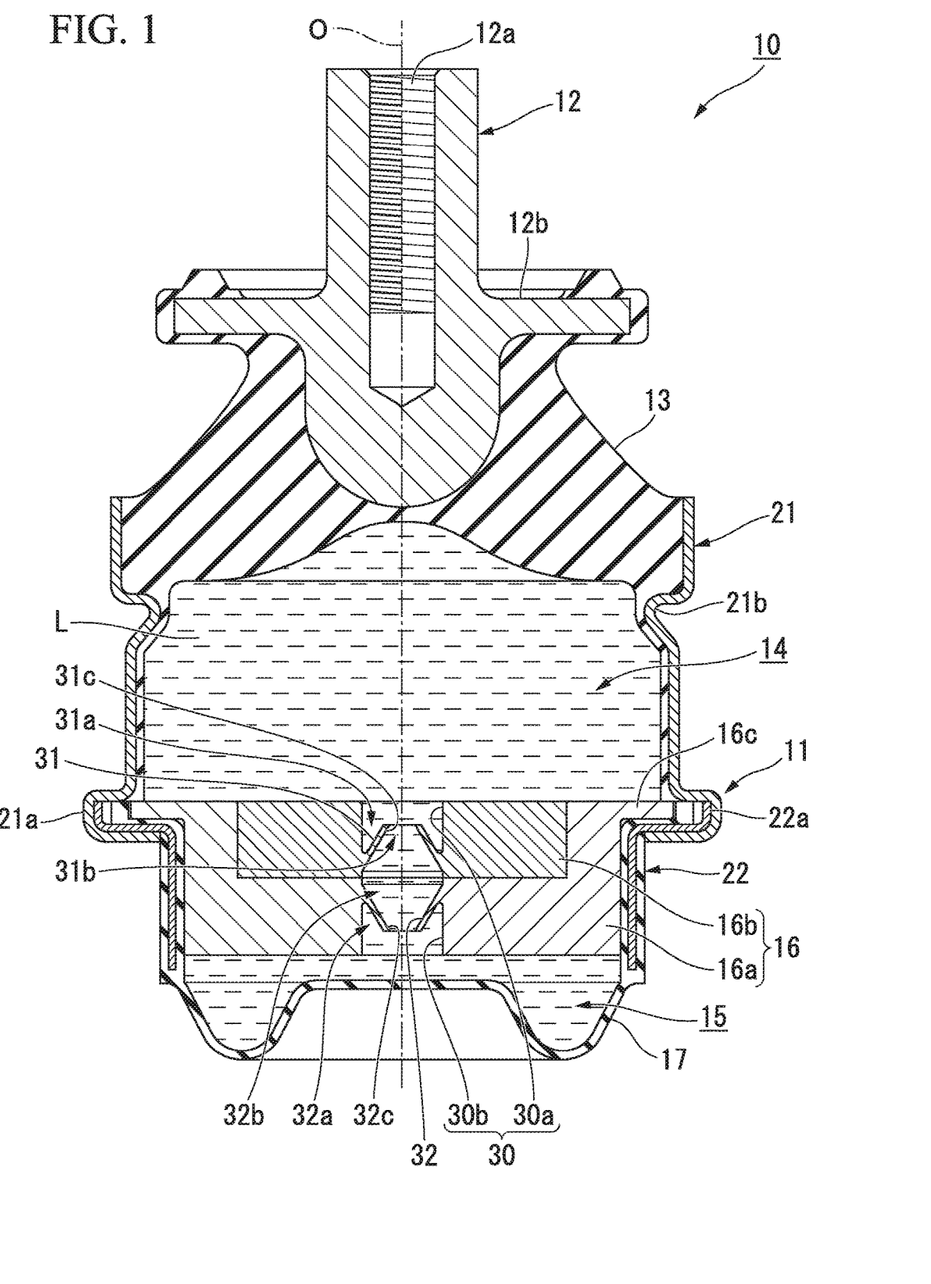
FIG. 1 is a longitudinal cross-sectional view of a vibration damping device according to a first embodiment of the present invention.

As shown in FIG. 1, a vibration damping device 10 includes a first tubular attachment member 11 coupled to one of a vibration-generating part and a vibration-receiving part, a second attachment member 12 coupled to the other part, an elastic body 13 configured to couple the attachment members 11 and 12 to each other, and a partition member 16 configured to partition a liquid chamber in the first attachment member 11 in which a liquid L is sealed into a main liquid chamber (a first liquid chamber) 14 having the elastic body 13 as a portion of a wall surface and a subsidiary liquid chamber (a second liquid chamber) 15.

In the illustrated example, the second attachment member 12 is formed in a columnar shape, the elastic body 13 is formed in a tubular shape, and the first attachment member 11, the second attachment member 12, and the elastic body 13 are disposed coaxially with a common axis. Hereinafter, the common axis is referred to as an axis (an axis of the first attachment member or an axis of the communicating passage) O, a side of the main liquid chamber 14 in an axis O direction (an axial direction of the communicating passage) is referred to as one side, and a side of the subsidiary liquid chamber 15 is referred to as the other side. A direction perpendicular to the axis O is referred to as a radial direction (a radial direction of the communicating passage), and a direction around the axis O is referred to as a circumferential direction (a circumferential direction of the communicating passage).

When the vibration damping device 10 is mounted on, for example, a vehicle, the second attachment member 12 is coupled to an engine serving as the vibration-generating part, and the first attachment member 11 is coupled to a vehicle body serving as the vibration-receiving part via a bracket (not shown), thereby suppressing vibrations of the engine from being transferred to the vehicle body. The vibration damping device 10 is a liquid-sealed type in which the liquid L such as, for example, ethylene glycol, water, or silicone oil is sealed in the liquid chamber of the first attachment member 11.

The first attachment member 11 includes a one-side outer rim body 21 at the one side in the axis O direction and an other-side outer rim body 22 at the other side.

The elastic body 13 is coupled to an end of the one side in the one-side outer rim body 21 in a liquid-tight state, and an opening of the one side in the one-side outer rim body 21 is closed by the elastic body 13. An end 21a of the one-side outer rim body 21 of the other side is formed larger in diameter than other portions of the one-side outer rim body 21. Also, the inside of the one-side outer rim body 21 is the main liquid chamber 14. A liquid pressure of the main liquid chamber 14 changes as the elastic body 13 is deformed and an inner capacity of the main liquid chamber 14 is changed when vibrations are input. An annular groove 21b which continuously extends throughout the entire circumference is formed in a portion adjacent from the other side to a portion of the one-side outer rim body 21 to which the elastic body 13 is coupled.

A diaphragm 17 is coupled to an end of the other side in the other-side outer rim body 22 in a liquid-tight state, and an opening of the other side in the other-side outer rim body 22 is closed by the diaphragm 17. An end 22a of the other-side outer rim body 22 of the one side is formed larger in diameter than other portions and is fitted into the end 21a of the one-side outer rim body 21 of the other side. A partition member 16 is fitted into the other-side outer rim body 22, and a portion inside the other-side outer rim body 22 disposed between the partition member 16 and the diaphragm 17 is the subsidiary liquid chamber 15. The subsidiary liquid chamber 15 has the diaphragm 17 as a portion of a wall surface and is expanded or contracted as the diaphragm 17 is deformed. The other-side outer rim body 22 is covered with a rubber membrane integrally formed with the diaphragm 17 over approximately the entire area.

A female thread part 12a is formed coaxially with the axis O of an end surface of the second attachment member 12 of the one side. The second attachment member 12 protrudes from the first attachment member 11 to the one side. A flange part 12b protruding outward in a radial direction and continuously extending throughout the entire circumference is formed on the second attachment member 12. The flange part 12b is away from an edge of the first attachment member 11 of the one side to the one side.

The elastic body 13 is formed by an elastically deformable material such as rubber, and is formed in a tubular shape whose diameter is gradually increased from the one side toward the other side. An end of the elastic body 13 of the one side is coupled to the second attachment member 12, and an end thereof of the other side is coupled to the first attachment member 11. Note that an inner circumferential surface of the one-side outer rim body 21 of the first attachment member 11 is covered with a rubber membrane integrally formed with the elastic body 13 over approximately the entire area.

The partition member 16 includes a main body 16a and a fitting part 16b. The main body 16a is formed in a bottomed tubular shape which is disposed coaxially with the axis O and is fitted into the first attachment member 11. A flange part 16c protruding outward in a radial direction is provided at the main body 16a. The flange part 16c is provided at an end of the main body 16a of the one side. The flange part 16c is disposed in the end 22a of the other-side outer rim body 22 of the one side.

The fitting part 16b is formed in a columnar shape which is disposed coaxially with the axis O and is fitted into the main body 16a. An end surface of the fitting part 16b which faces the one side is flush with an end surface of the main body 16a which faces the one side. A size of the fitting part 16b in the axis O direction is equal to a size of a bottom of the main body 16a in the axis O direction.

A communicating passage 30 configured to communicate the main liquid chamber 14 with the subsidiary liquid chamber 15 is provided in the partition member 16. The main liquid chamber 14 and the subsidiary liquid chamber 15 are communicated only via the communicating passage 30. The communicating passage 30 extends in the axis O direction and is individually open at both end surfaces of the partition member 16 in the axis O direction. The communicating passage 30 extends in a linear shape in the axis O direction and is formed in a columnar shape coaxially with the axis O. The communicating passage 30 is constituted by a first through-hole 30a penetrating through the fitting part 16b in the axis O direction and a second through-hole 30b penetrating through the bottom of the main body 16a in the axis O direction.

In the embodiment, flow-changing protrusions 31 and 32 configured to change a flow of the liquid L flowing in the communicating passage 30 are provided at an inner circumferential surface of the communicating passage 30.

The flow-changing protrusions 31 and 32 protrude inward in a radial direction from the inner circumferential surface of the communicating passage 30 and change the flow of the liquid L flowing in the communicating passage 30 in the axis O direction. The flow-changing protrusions 31 and 32 cause the liquid L flowing in the communicating passage 30 to flow along surfaces of the flow-changing protrusions 31 and 32, thereby bending the flow of the liquid L. The flow-changing protrusions 31 and 32 are rigid bodies having rigidity that prevents them from being deformed when receiving the flow of the liquid L. The flow-changing protrusions 31 and 32 are integrally formed with the partition member 16 using a material such as, for example, a resin. The plurality of flow-changing protrusions 31 and 32 may be provided in the axis O direction, and the pair of flow-changing protrusions 31 and 32 is provided at an interval in the axis O direction in the illustrated example.

Figure 2:
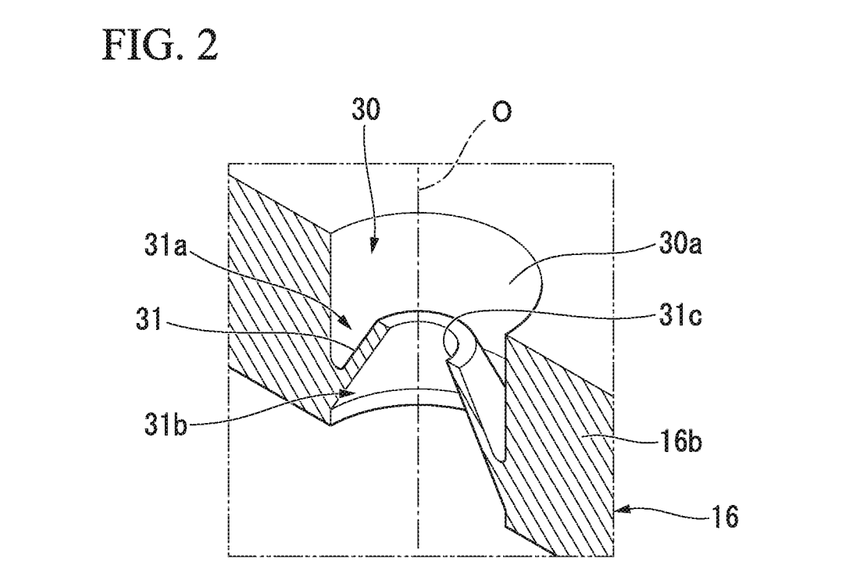
FIG. 2 is a partial cross-sectional perspective diagram of a fitting part provided in a partition member constituting the vibration damping device shown in FIG. 1.

In the embodiment, as shown in FIGS. 1 and 2, the communicating passage 30 and the flow-changing protrusions 31 and 32 are formed symmetrically with respect to the axis O when viewed in a longitudinal cross section passing through the axis O and the flow-changing protrusions 31 and 32. The communicating passage 30 and the flow-changing protrusions 31 and 32 are formed line-symmetrically with respect to the axis O when viewed in the longitudinal cross section. The flow-changing protrusion 31 is disposed throughout the entire circumference in a circumferential direction and continuously extends throughout the entire circumference in the circumferential direction in the illustrated example.

The flow-changing protrusions 31 and 32 are formed in a tubular shape, a cylindrical shape in the illustrated example, extending in the axis O direction. One ends of the flow-changing protrusions 31 and 32 in the axis O direction are base ends (fixed ends) coupled to the inner circumferential surface of the communicating passage 30, and the other ends thereof in the axis O direction are projecting ends (free ends) which are not coupled to the inner circumferential surface of the communicating passage 30.

Outer circumferential surfaces of the flow-changing protrusions 31 and 32 have diameters which are gradually decreased from the base ends toward the projecting ends and are inclined in a linear shape with respect to the axis O when viewed in the longitudinal cross section. Note that, in the embodiment, diameters of inner circumferential surfaces of the flow-changing protrusions 31 and 32 are also gradually decreased from the base ends toward the projecting ends, and diameters of both of the flow-changing protrusions 31 and 32 are gradually decreased from the base ends toward the projecting ends.

The projecting ends of the flow-changing protrusions 31 and 32 form inner circumferential edges of passing holes 31c and 32c which are open toward both sides in the axis O direction. In the illustrated example, both openings of the flow-changing protrusions 31 and 32 of sides of the projecting ends are the passing holes 31c and 32c, and the projecting ends of the flow-changing protrusions 31 and 32 constitute the entire inner circumferential edges of the passing holes 31c and 32c. Minimum cross-sectional areas of the passing holes 31c and 32c are less than or equal to half of a maximum cross-sectional area of the communicating passage 30. The minimum cross-sectional areas of the passing holes 31c and 32c are minimum cross-sectional areas among cross-sectional areas in cross sections of the passing holes 31c and 32c in a direction perpendicular to the axis O. The maximum cross-sectional area in the communicating passage 30 is a maximum cross-sectional area among cross-sectional areas in cross sections of the communicating passage 30 in a direction perpendicular to the axis O.

Here, in the embodiment, one first flow-changing protrusion 31 and one second flow-changing protrusion 32 are provided as the flow-changing protrusions. A first passing hole 31c (the passing hole) which is the opening on the side of the projecting end (the free end) of the first flow-changing protrusion 31 faces the one side. A second passing hole 32c (the passing hole) which is the opening on the side of the projecting end (the free end) of the second flow-changing protrusion 32 faces the other side.

The first flow-changing protrusion 31 is positioned at the one side, and the second flow-changing protrusion 32 is positioned at the other side. Both of the flow-changing protrusions 31 and 32 are positioned in the communicating passage 30 over the entire length in the axis O direction. The flow-changing protrusions 31 and 32 are formed symmetrically to each other in the axis O direction. The base ends (the fixed ends) of the flow-changing protrusions 31 and 32 are separated in the axis O direction. The first flow-changing protrusion 31 is provided at the inner circumferential surface of the first through-hole 30a and integrally formed with the fitting part 16b. The second flow-changing protrusion 32 is provided at the inner circumferential surface of the second through-hole 30b and is integrally formed with the main body 16a.

The flow-changing protrusions 31 and 32 partition the inside of the communicating passage 30 into flow-changing spaces 31a and 32a configured to change the flow of the liquid L flowing into the inside and passing spaces 31b and 32b configured to pass the liquid L flowing into the inside. The flow-changing protrusions 31 and 32 form the flow-changing spaces 31a and 32a between the flow-changing protrusions 31 and 32 and the inner circumferential surface of the communicating passage 30.

The flow-changing spaces 31a and 32a are formed between the outer circumferential surfaces of the flow-changing protrusions 31 and 32 and the inner circumferential surface of the communicating passage 30. The outer circumferential surfaces of the flow-changing protrusions 31 and 32 are defining surfaces configured to define the flow-changing spaces 31a and 32a and are inclined with respect to the axis O when viewed in the longitudinal cross section.

The passing spaces 31b and 32b include the passing holes 31c and 32c. The passing spaces 31b and 32b are formed by the inner circumferential surfaces of the flow-changing protrusions 31 and 32. The passing spaces 31b and 32b are constituted by the entire insides of the flow-changing protrusions 31 and 32, that is, the entire insides of the flow-changing protrusions 31 and 32 are the passing spaces 31b and 32b.

The first flow-changing protrusion 31 partitions the inside of the communicating passage 30 into a first flow-changing space 31a serving as the flow-changing space and a first passing space 31b serving as the passing space.

The first flow-changing space 31a is formed in an annular shape coaxially with the axis O and is open toward the one side. When viewed in the longitudinal cross section, a space width of the first flow-changing space 31a in a radial direction gradually becomes smaller from the one side toward the other side. A bottom of the first flow-changing space 31a faces the one side and couples the outer circumferential surface of the first flow-changing protrusion 31 and the inner circumferential surface of the communicating passage 30. The bottom of the first flow-changing space 31a when viewed in the longitudinal cross section is formed in a concave curved surface shape which is recessed toward the other side.

As shown in FIG. 2, the first passing space 31b is formed in a frustum shape, a truncated conical shape in the illustrated example, coaxially with the axis O and is open toward both sides in the axis O direction. A diameter of the first passing space 31b is gradually increased from the one side toward the other side.

As shown in FIG. 1, the second flow-changing protrusion 32 partitions the inside of the communicating passage 30 into the second flow-changing space 32a serving as the flow-changing space and the second passing space 32b serving as the passing space.

The second flow-changing space 32a is formed in an annular shape coaxially with the axis O and is open toward the other side. A space width of the second flow-changing space 32a in the radial direction when viewed in the longitudinal cross section gradually becomes smaller from the other side toward the one side. A bottom of the second flow-changing space 32a faces the other side and couples the outer circumferential surface of the second flow-changing protrusion 32 and the inner circumferential surface of the communicating passage 30. When viewed in the longitudinal cross section, the bottom of the second flow-changing space 32a is formed in a concave curved surface shape which is recessed toward the one side.

The second passing space 32b is formed in a frustum shape, a truncated conical shape in the illustrated example, coaxially with the axis O and is open toward both sides in the axis O direction. A diameter of the second passing space 32b is gradually increased from the other side toward the one side.

Next, an action of the vibration damping device 10 will be described.

When vibrations in the axis O direction are input to the vibration damping device 10 shown in FIG. 1 from the vibration-generating part, both of the attachment members 11 and 12 relatively displace while the elastic body 13 elastically deforms, thereby changing a liquid pressure of the main liquid chamber 14. Then, the liquid L is caused to be exchanged between the main liquid chamber 14 and the subsidiary liquid chamber 15 via the communicating passage 30. In this case, when the liquid L in the main liquid chamber 14 is caused to flow toward the subsidiary liquid chamber 15 via the communicating passage 30, the liquid L first flows into the communicating passage 30 from the opening of the communicating passage 30 of the one side. Also, the liquid L reaches a portion of the communicating passage 30 at which the first flow-changing protrusion 31 is positioned.

Figure 3:
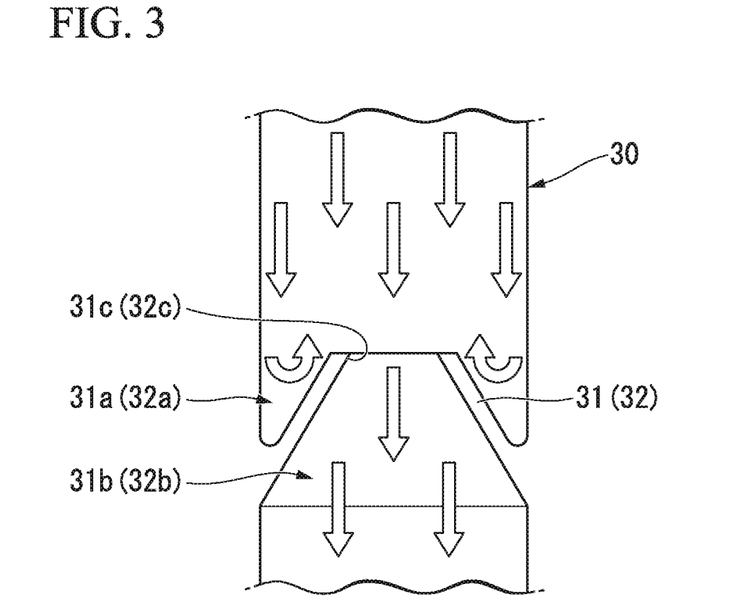
FIG. 3 is a view describing one flow-changing space and one passing space provided in the partition member constituting the vibration damping device shown in FIG. 1.

As shown in FIG. 3, among the liquid L, the liquid L flowing along the outside in a radial direction in the communicating passage 30 flows into the first flow-changing space 31a and flows toward the side of the projecting end of the first flow-changing protrusion 31 along a surface of the first flow-changing protrusion 31 so that the flow changes in the radial direction. The liquid L flowing along the inside in the radial direction in the communicating passage 30 passes through the first passing hole 31c, flows into the first passing space 31b, and passes through the first passing space 31b in the axis O direction. In this case, for example, the flow of the liquid L flowing into the first flow-changing space 31a is changed to flow along the outer circumferential surface of the first flow-changing protrusion 31, and the liquid L can be turned about a circumference as a turning axis extending in a circumferential direction. Note that, in the embodiment, since the bottom of the first flow-changing space 31a is formed in the concave curved surface shape, the flow of the liquid L can be effectively changed.

Here, vibrations such as, for example, an idle vibration (e.g., a frequency is 18 Hz to 30 Hz and an amplitude is ±0.5 mm or less) and a shake vibration lower in frequency and greater in amplitude than the idle vibration (e.g., a frequency is 14 Hz or less and an amplitude is greater than ±0.5 mm) are normally input to the vibration damping device 10. The idle vibration among the vibrations is relatively small in amplitude but is high in frequency, and the shake vibration is low in frequency but is great in amplitude. Therefore, when such normal vibrations are input, a flow rate of the liquid L flowing into the communicating passage 30 can be increased to a predetermined level or more.

As a result, for example, pressure loss of the liquid L is increased due to energy loss occurring when the liquid L caused to pass through the first passing hole 31c in the axis O direction and the liquid L whose flow is changed by the first flow-changing protrusion 31 collide with each other, etc., thereby absorbing and attenuating the vibrations. Examples of factors increasing the pressure loss of the liquid L may include viscous resistance of the liquid L, energy loss occurring when the flow of the liquid L is changed and a turning flow is formed, energy loss due to friction between the liquid L and the first flow-changing protrusion 31, etc.

Here, in the vibration damping device 10, the communicating passage 30 and the flow-changing protrusions 31 and 32 are formed symmetrically with respect to the axis O when viewed in the longitudinal cross section. Therefore, the flow of the liquid L flowing along portions at both outer sides in the radial direction when viewed in the longitudinal cross section is changed symmetrically with respect to the axis O by the first flow-changing protrusion 31. Since the liquid L whose flow is changed in this way collides with a liquid caused to pass through the first passing hole 31c in the axis O direction from both outer sides in the radial direction, the pressure loss of the liquid L is effectively increased.

The liquid L passing through the first passing hole 31c and flowing into the first passing space 31b flows in the first passing space 31b in the axis O direction, passes through the first passing space 31b, and reaches the inside of the second passing space 32b. Then, the liquid L flows in the second passing space 32b in the axis O direction, passes through the second passing hole 32c, and flows into the subsidiary liquid chamber 15 from the opening of the communicating passage 30 of the other side.

Also, when the liquid L in the subsidiary liquid chamber 15 is caused to flow toward the main liquid chamber 14 via the communicating passage 30, the liquid L first flows into the communicating passage 30 from the opening of the communicating passage 30 of the other side and reaches a portion of the communicating passage 30 at which the second flow-changing protrusion 32 is positioned. Then, the liquid L flowing along the outside in the radial direction in the communicating passage 30 among the liquid L flows into the second flow-changing space 32a, thereby changing the flow. On the other hand, the liquid L flowing along the inside in the radial direction in the communicating passage 30 among the liquid L flows into the second passing space 32b via the second passing hole 32c and passes through the second passing space 32b. Even in this case, when the flow rate of the liquid L is a predetermined level or more, the flow of the liquid L flowing into the second flow-changing space 32a is changed so that the pressure loss of the liquid L can be increased to absorb and attenuate the vibrations. Here, in the embodiment, since the bottom of the second flow-changing space 32a is formed in the concave curved surface shape, the flow of the liquid L in the second flow-changing space 32a can be effectively changed.

The liquid L flowing into the second passing space 32b sequentially passes in the second passing space 32b and the first passing space 31b and flows into the main liquid chamber 14 from the opening of the communicating passage 30 of the one side.

For example, minute vibrations higher in frequency and remarkably smaller in amplitude than an assumption, etc. are unintentionally input to the vibration damping device 10 in some cases. When the minute vibrations are input, the flow rate of the liquid L flowing into the communicating passage 30 is slow. Thus, even if the flow-changing protrusions 31 and 32 change the flow of the liquid L in the communicating passage 30, the pressure loss of the liquid L is suppressed. As a result, since the liquid L passes through the passing spaces 31b and 32b and smoothly flows between the main liquid chamber 14 and the subsidiary liquid chamber 15, an increase of a dynamic spring constant is suppressed.

As described above, according to the vibration damping device 10 of the embodiment, the pressure loss of the liquid L is increased according to the flow rate of the liquid L, flowing in the communicating passage 30 so that the vibrations can be absorbed and attenuated. As a result, for example, when normal vibrations such as an idle vibration and a shake vibration are input, the vibrations can be absorbed and attenuated irrespective of frequencies of the vibrations. Therefore, abnormal noise is suppressed while a plurality of types of vibrations with different frequencies are absorbed and attenuated so that simplification of a structure and facilitation of manufacture can be achieved.

Also, while the pressure loss of the liquid L with a slow flow rate is suppressed, the liquid L smoothly flows in the communicating passage 30, thereby suppressing the increase of the dynamic spring constant. Therefore, for example, when the flow rate of the liquid L is slower than when normal vibrations are input such as when unintentional vibrations such as minute vibrations higher in frequency and remarkably smaller in amplitude than the normal vibrations are input, etc., the increase of the dynamic spring constant can be suppressed so that product features of the vibration damping device can be easily secured.

Since the flow-changing protrusions 31 and 32 partition the inside of the communicating passage 30 into the flow-changing spaces 31a and 32a and the passing spaces 31b and 32b, the flow-changing protrusions can suppress and accurately change the flow of the liquid L flowing into the flow-changing spaces 31a and 32a from an influence of the liquid L passing through the passing spaces 31b and 32b. Therefore, when the flow rate of the liquid L increases, the pressure loss of the liquid L can be reliably increased.

Since the flow-changing spaces 31a and 32a are formed between the outer circumferential surfaces of the flow-changing protrusions 31 and 32 and the inner circumferential surface of the communicating passage 30, the flow-changing spaces 31a and 32a can be formed throughout the entire circumference in the circumferential direction. Thus, the flow of the liquid L flowing along the outside in the radial direction in the communicating passage 30 among the liquid L flowing through the communicating passage 30 can be changed throughout the entire circumference in the circumferential direction. Therefore, when the flow rate of the liquid L increases, the pressure loss of the liquid L can be more reliably increased.

Since the passing spaces 31b and 32b are formed by the inner circumferential surfaces of the flow-changing protrusions 31 and 32, the passing spaces 31b and 32b can be open toward both sides in the axis O direction. Thus, the liquid L passing through the passing spaces 31b and 32b can flow through the passing spaces 31b and 32b in the axis O direction so that the liquid L can flow through the passing spaces 31b and 32b smoothly.

The diameters of the outer circumferential surfaces of the flow-changing protrusions 31 and 32 are gradually decreased from the base ends toward the projecting ends. Therefore, as shown in FIG. 3, as the flow of the liquid L flowing into the flow-changing spaces 31a and 32a is changed to flow along the outer circumferential surfaces of the flow-changing protrusions 31 and 32, the liquid L is turned about a turning axis extending in the circumferential direction so that a direction of the flow of the liquid L can be reversed in the axis O direction. Thus, the pressure loss of the liquid L occurring when the liquid L caused to pass through the passing holes 31c and 32c in the axis O direction collides with the liquid L whose flow is changed by the flow-changing protrusions 31 and 32 can be more reliably increased.

In the embodiment, the diameters of the inner circumferential surfaces of the flow-changing protrusions 31 and 32 are also gradually decreased from the base ends toward the projecting ends, and the diameters of both of the flow-changing protrusions 31 and 32 are gradually decreased from the base ends toward the projecting ends. In this case, when the liquid L flowing into the passing spaces 31b and 32b from the passing holes 31c and 32c flows through the passing spaces 31b and 32b in the axis O direction, energy loss due to a friction between the liquid L and the inner circumferential surfaces of the flow-changing protrusions 31 and 32 can be suppressed so that the liquid L can flow through the passing spaces 31b and 32b more smoothly.

The first flow-changing protrusion 31 and the second flow-changing protrusion 32 are provided as the flow-changing protrusions. Therefore, the flow of the liquid L flowing from the main liquid chamber 14 to the subsidiary liquid chamber 15 is changed by the first flow-changing protrusion 31 so that the pressure loss of the liquid L is increased, and even when the flow of the liquid L flowing from the subsidiary liquid chamber 15 to the main liquid chamber 14 is changed by the second flow-changing protrusion 32, the pressure loss of the liquid L can be increased. Thus, the vibration can be effectively absorbed and attenuated.

Second Embodiment

Figure 4:
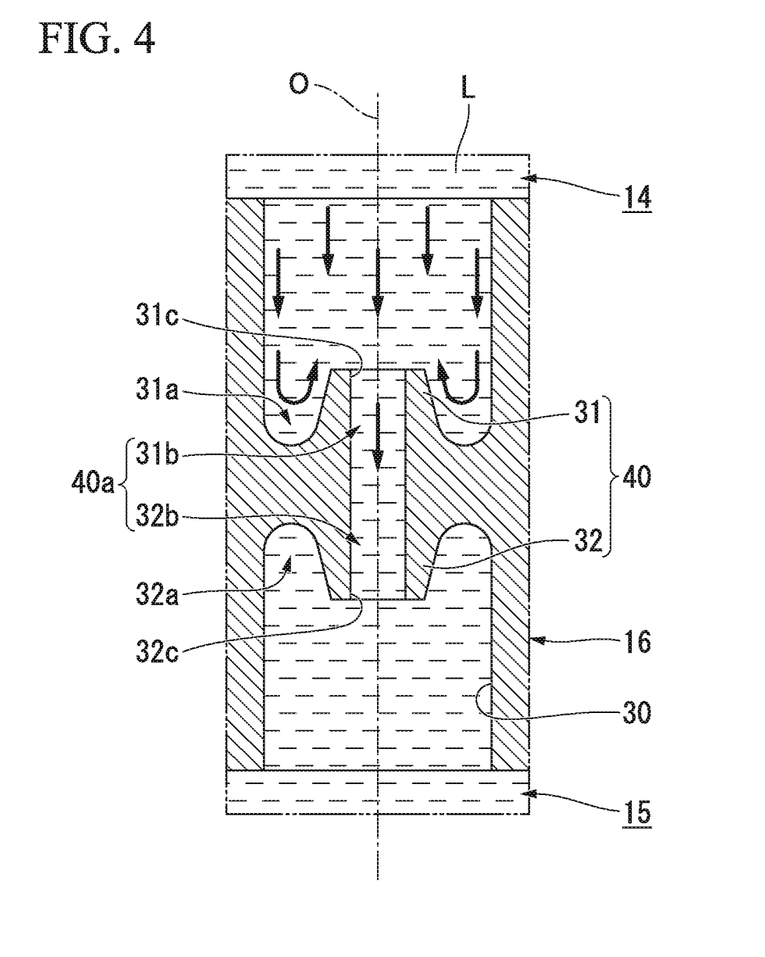
FIG. 4 is an enlarged view of a major part of a longitudinal cross-sectional view of a vibration damping device according to a second embodiment of the present invention.

Next, a second embodiment of the vibration damping device according to the present invention will be described with reference to FIG. 4.

Note that, in the second embodiment, the same elements as those in the first embodiment are denoted by the same reference numerals, overlapping description thereof will be omitted, and only differences thereof will be described.

In the vibration damping device of the embodiment, the first flow-changing protrusion 31 and the second flow-changing protrusion 32 are disposed adjacent to each other in the axis O direction, and the base ends of the flow-changing protrusions 31 and 32 are directly connected. The inner circumferential surfaces of the flow-changing protrusions 31 and 32 have the same diameter over the entire length in the axis O direction, and the passing spaces 31b and 32b are formed in columnar shapes which extend in the axis O direction. The end of the other side of the first passing space 31b and the end of the one side of the second passing space 32b are directly connected.

A coupling body 40 in which the base ends of the flow-changing protrusions 31 and 32 are directly connected is formed in a tubular shape which extends in the axis O direction in the vibration damping device. The inside of the coupling body 40 forms a connection space 40a in which the passing spaces 31b and 32b are connected in the axis O direction. The inner circumferential surface of the connection space 40a smoothly continues over the entire length in the axis O direction and does not have a stepped portion.

Third Embodiment

Figure 5:
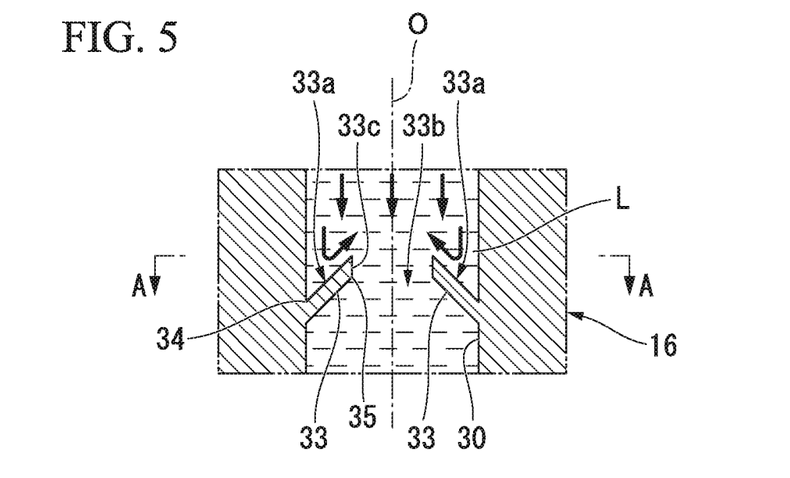
FIG. 5 is an enlarged view of a major part of a longitudinal cross-sectional view of a vibration damping device according to a third embodiment of the present invention.

Next, a third embodiment of the vibration damping device according to the present invention will be described with reference to FIGS. 5 and 6.

Note that, in the third embodiment, the same elements as those in the first embodiment are denoted by the same reference numerals, overlapping description thereof will be omitted, and only differences thereof will be described.

In the vibration damping device of the embodiment, flow-changing protrusions 33 are formed in plate shapes which protrude from the inner circumferential surface of the communicating passage 30 instead of being formed in tubular shapes which extend in the axis O direction. The flow-changing protrusions 33 may be intermittently disposed throughout the entire circumference in the circumferential direction, and the pair of flow-changing protrusions is formed to surround the axis O in the illustrated example. The flow-changing protrusions 33 are formed in the same shape and size as each other.

The flow-changing protrusions 33 have semicircular shapes when seen in a cross section of the communicating passage 30 perpendicular to the axis O. Outer peripheral edges of the flow-changing protrusions 33 are constituted by coupling parts 34 and connection parts 35. The coupling parts 34 extend in circular arc shapes in the circumferential direction. The coupling parts 34 are continuously coupled to the inner circumferential surface of the communicating passage 30 over the entire length in the circumferential direction. The connection parts 35 extend in linear shapes to connect both ends in the circumferential direction of the coupling parts 34. The pair of flow-changing protrusions 33 is symmetrically disposed to surround the axis O when seen in the cross section, and the pair of flow-changing protrusions 33 are opposed to each other in the radial direction.

The communicating passage 30 and the flow-changing protrusions 33 are formed symmetrically with respect to the axis O when viewed in the longitudinal cross section passing through the axis O and central portions in the circumferential direction of the coupling parts 34. The flow-changing protrusions 33 protrude to be inclined in the axis O direction from the inner circumferential surface of the communicating passage 30 when viewed in the longitudinal cross section.

The passing hole 33c is formed between the protrusions of the pair of flow-changing protrusions 33 in the vibration damping device. The passing hole 33c is a long hole shape between the connection parts 35 when seen in the cross section. Also, the flow-changing spaces 33a are limitedly open toward one side in the axis O direction and are formed between surfaces of the flow-changing protrusions 33 and the inner circumferential surface of the communicating passage 30. Also, the passing space 33b is open toward both sides in the axis O direction, and parts of wall surfaces of the passing space 33b are constituted by the surfaces of the flow-changing protrusions 33.

Figure 6:
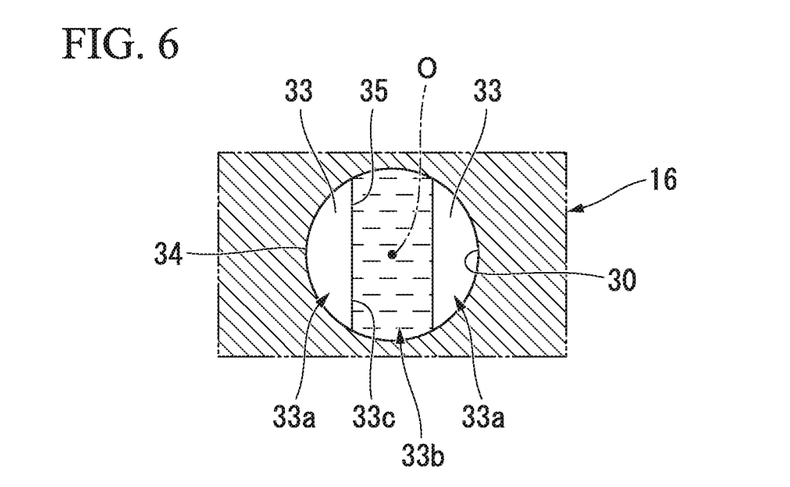
FIG. 6 is a cross-sectional view taken along an arrow A-A shown in FIG. 5.

As shown in FIG. 6, in the embodiment, the pair of flow-changing protrusions 33 is symmetrically disposed to surround the axis O when seen in the cross section, but the present invention is not limited thereto. Other aspects in which at least parts of the pair of flow-changing protrusions are opposed in the radial direction may be adopted as a pair of flow-changing protrusions.

Fourth Embodiment

Figure 7:
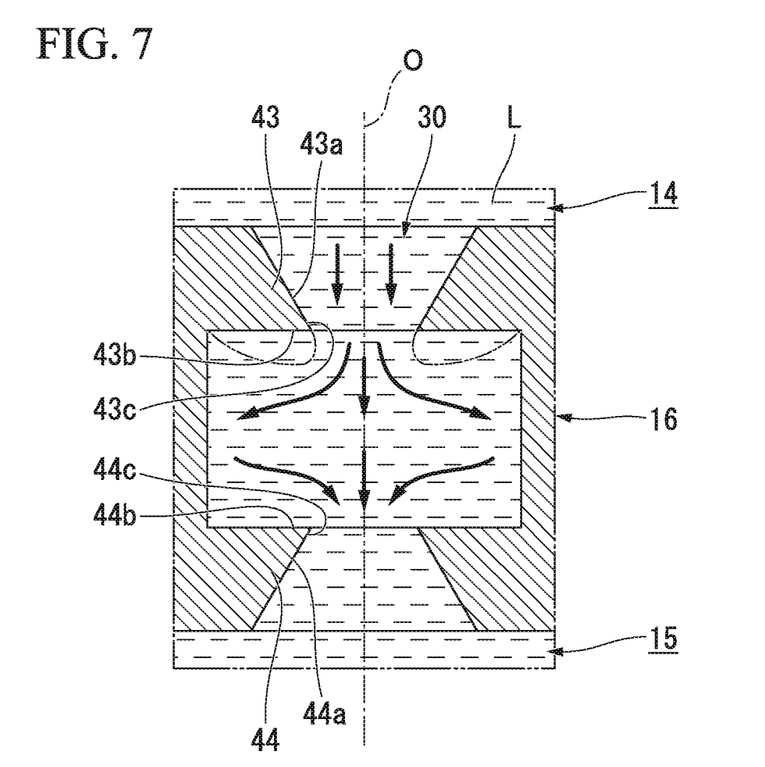
FIG. 7 is an enlarged view of a major part of a longitudinal cross-sectional view of a vibration damping device according to a fourth embodiment of the present invention.

Next, a fourth embodiment of the vibration damping device according to the present invention will be described with reference to FIG. 7.

Note that, in the fourth embodiment, the same elements as those in the first embodiment are denoted by the same reference numerals, overlapping description thereof will be omitted, and only differences thereof will be described.

In the vibration damping device of the embodiment, flow-changing protrusions 43 and 44 are formed in annular shapes which are open in the axis O direction instead of being formed in tubular shapes which extend in the axis O direction. The flow-changing protrusions 43 and 44 continuously extend throughout the entire circumference in the circumferential direction. Also, the inside of the communicating passage 30 is not partitioned by the flow-changing spaces and the passing spaces in the vibration damping device. Diameters of both ends of the communicating passage 30 in the axis O direction are smaller than a central portion between both ends in the vibration damping device. The flow-changing protrusions 43 and 44 are individually provided at both ends of the communicating passage 30 in the axis O direction.

The flow-changing protrusions 43 and 44 are formed in right triangular shapes which are convex inward in the radial direction when viewed in the longitudinal cross section. Inclined end surfaces 43a and 44a inclined with respect to the axis O when viewed in the longitudinal cross section and orthogonal end surfaces 43b and 44b perpendicular to the axis O when viewed in the longitudinal cross section are provided at end surfaces of the flow-changing protrusions 43 and 44 which face the axis O direction.

Here, one first flow-changing protrusion 43 and one second flow-changing protrusion 44 are provided as the flow-changing protrusions in the embodiment. The first flow-changing protrusion 43 is provided at the end of the one side of the communicating passage 30, and the inclined end surface 43a of the first flow-changing protrusion 43 faces the one side. The first passing hole 43c is provided inside the first flow-changing protrusion 43 as the passing hole. The second flow-changing protrusion 44 is provided at the end of the other side of the communicating passage 30, and the inclined end surface 44a of the second flow-changing protrusion 44 faces the other side. The second passing hole 44c is provided inside the second flow-changing protrusion 44 as the passing hole.

When vibrations are input to the vibration damping device, the liquid L flows in the axis O direction via the communicating passage 30 toward the subsidiary liquid chamber 15 from the main liquid chamber 14 and flows into the communicating passage 30 from the end of the one side of the communicating passage 30. The liquid L flowing along the outside in the radial direction in the communicating passage 30 among the liquid L flows along the inclined end surface 43a of the first flow-changing protrusion 43 from a base end side toward a tip side so that the flow is changed inward in the radial direction. The liquid L flowing along the inside in the radial direction in the communicating passage 30 among the liquid L flowing into the communicating passage 30 is caused to pass through the first passing hole 43c in the axis O direction.

Therefore, when the flow rate of the liquid L increases, the pressure loss of the liquid L is increased due to, for example, energy loss occurring when the liquid L caused to pass through the first passing hole 43c in the axis O direction and the liquid L whose flow is changed by the first flow-changing protrusion 43 collide with each other, etc., thereby absorbing and attenuating the vibrations. Examples of factors increasing the pressure loss of the liquid L may include a decrease of an effective cross-sectional area due to a separation of the flow at the central portion in the axis O direction of the communicating passage 30 (refer to a two-dot chain line shown in the central portion of FIG. 7), etc.

Here, a central portion of the communicating passage 30 in the axis O direction is larger in diameter than ends thereof. Therefore, when the liquid L passes through the first passing hole 43c and flows into the central portion of the communicating passage 30, the liquid L flowing along the outside in the radial direction in the communicating passage 30 among the liquid L spreads to the outside in the radial direction to flow along the inner circumferential surface of the central portion and flows in the axis O direction. The liquid L is caused to pass through the second passing hole 44c from the central portion in the axis O direction in the communicating passage 30 and flow into the end of the other side. In this case, the liquid L flowing along the outside in the radial direction in the communicating passage 30 among the liquid L flows along the orthogonal end surface 44b of the second flow-changing protrusion 44 from a base end side toward a tip side so that the flow is changed inward in the radial direction.

Therefore, when the flow rate of the liquid L increases, the pressure loss of the liquid L is increased due to, for example, energy loss occurring when the liquid L caused to pass through the second passing hole 44c in the axis O direction and the liquid L whose flow is changed by the second flow-changing protrusion 44 collide with each other, etc., thereby absorbing and attenuating the vibrations.

Fifth Embodiment

Figure 8:
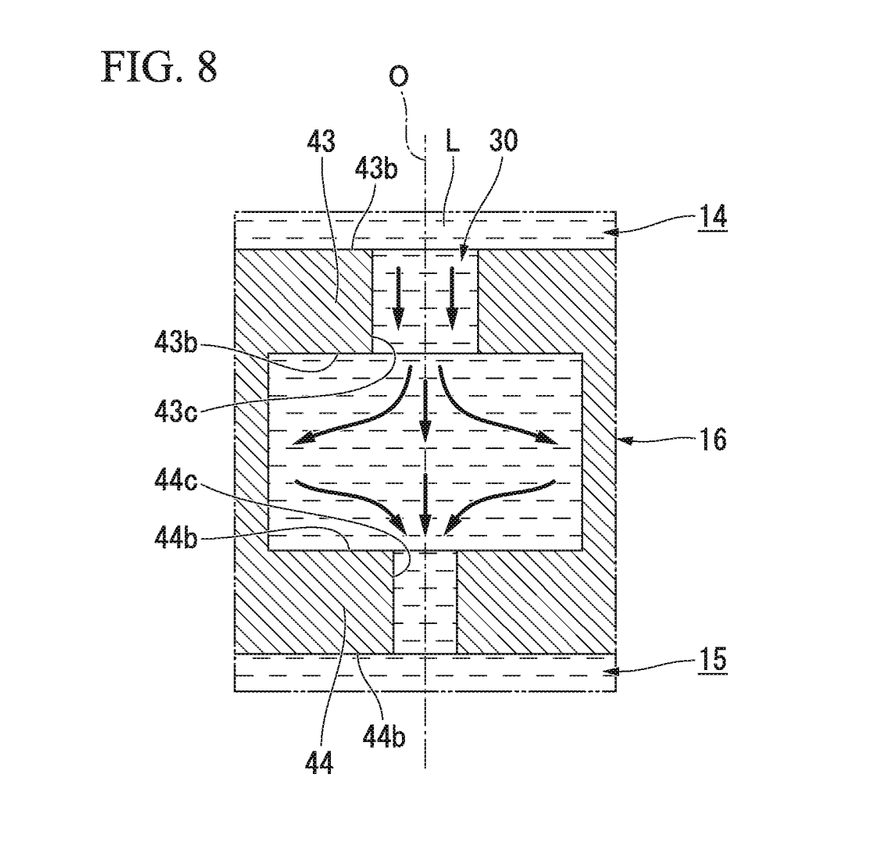
FIG. 8 is an enlarged view of a major part of a longitudinal cross-sectional view of a vibration damping device according to a fifth embodiment of the present invention.

Next, a fifth embodiment of the vibration damping device according to the present invention will be described with reference to FIG. 8.

Note that, in the fifth embodiment, the same elements as those in the fourth embodiment are denoted by the same reference numerals, overlapping description thereof will be omitted, and only differences thereof will be described.

In the vibration damping device of the embodiment, the flow-changing protrusions 43 and 44 are formed in rectangular shapes instead of being formed in right triangular shapes which are convex inward in the radial direction when viewed in the longitudinal cross section. Both end surfaces of each of the flow-changing protrusions 43 and 44 are the orthogonal end surfaces 43b and 44b. The first passing hole 43c is provided in the first flow-changing protrusion 43 over the entire length in the axis O direction of the first flow-changing protrusion 43. The second passing hole 44c is provided in the second flow-changing protrusion 44 over the entire length in the axis O direction of the second flow-changing protrusion 44. The first passing hole 43c and the second passing hole 44c have the same diameter over the entire length in the axis O direction. The first passing hole 43c is larger in diameter than the second passing hole 44c.

Note that the technical scope of the present invention is not limited to the embodiments and can be modified in various ways without departing from the gist of the present invention.

In the first, second, fourth, and fifth embodiments, the first flow-changing protrusions 31 and 43 are positioned at one side and the second flow-changing protrusions 32 and 44 are positioned at the other side, but the present invention is not limited thereto. For example, the first flow-changing protrusions may be positioned at the other side and the second flow-changing protrusions may be positioned at the one side.

Also, in the first, second, fourth, and fifth embodiments, one first flow-changing protrusions 31 and 43 and one second flow-changing protrusions 32 and 44 are provided as the flow-changing protrusions, but the present invention is not limited thereto. For example, the plurality of first flow-changing protrusions may be provided or the plurality of second flow-changing protrusions may be provided. Also, at least one of the first flow-changing protrusion and the second flow-changing protrusion may be provided as the flow-changing protrusion.

In the first and second embodiments, the diameters of the outer circumferential surfaces of the flow-changing protrusions 31 and 32 are gradually decreased from the base ends toward the projecting ends, but the present invention is not limited thereto. For example, the outer circumferential surfaces of the flow-changing protrusions are formed in tubular shapes which have the same diameter over the entire length in an axis direction, and the base ends of the flow-changing protrusions may be coupled to the inner circumferential surface of the communicating passage via the flange part.

The communicating passage 30 and the flow-changing protrusions 31, 32, 33, 43, and 44 may not be completely line-symmetrically formed with respect to the axis O when viewed in the longitudinal cross section. For example, shapes, sizes, etc. of the communicating passage and the flow-changing protrusions at one sides and the other sides in the radial direction with respect to the axis may have slight differences when viewed in the longitudinal cross section.

One communicating passage 30 may be provided or the plurality of communicating passages 30 may be provided in the present invention. When the plurality of communicating passages are provided, for example, the plurality of communicating passages may be provided on a concentric circle which extends in the circumferential direction to form an annular row of the communicating passages, and the plurality of annular rows having different diameters may be provided.

Also, the communicating passage 30 is disposed coaxially with the axis O in the embodiments, but the present invention is not limited thereto. For example, the axis of the communicating passage may be shifted with respect to the axis O while the communicating passage extends in the axis O direction, and the communicating passage may extend in the circumferential direction or in the radial direction.

Also, the main liquid chamber 14 and the subsidiary liquid chamber 15 are communicated only via the communicating passage 30 in the embodiments, but the present invention is not limited thereto. For example, the main liquid chamber and the subsidiary liquid chamber may be communicated via a restriction passage different from the communicating passage in addition to the communicating passage.

The partition member 16 partitions the liquid chamber in the first attachment member 11 into the main liquid chamber 14 having the elastic body 13 as a portion of the wall surface and the subsidiary liquid chamber 15 in the embodiments, but the present invention is not limited thereto. For example, the pair of elastic bodies may be provided in the axis direction instead of the diaphragm being provided, and a pressure-receiving liquid chamber having the elastic body as a portion of the wall surface may be provided instead of the subsidiary liquid chamber being provided. In other words, the present invention may be appropriately changed to other constitutions which include the partition members partition the liquid chamber in the first attachment member in which the liquid is sealed into the first liquid chamber and the second liquid chamber, wherein at least one of the liquid chambers, i.e., the first liquid chamber and the second liquid chamber, has the elastic body as a portion of the wall surface.

The case in which the engine is connected to the second attachment member 12 and the first attachment member 11 is connected to the vehicle body has been described in the embodiments, but a configuration in which these connections are reversed is also possible.

The vibration damping device 10 according to the present invention is not limited to an engine mount of the vehicle and can also be applied to components other than the engine mount. For example, the vibration damping device can also be applied to mounts of electric generators mounted on construction machines or can also be applied to mounts of machines installed at factories, etc.

In addition, the constituent elements of the above-described embodiments can be appropriately replaced with well-known constituent elements without departing from the gist of the present invention, and appropriately combined with the modified example described above.

INDUSTRIAL APPLICABILITY

In the vibration damping device, occurrence of abnormal noise is suppressed while product features are secured so that simplification of a structure and facilitation of manufacture can be achieved.

REFERENCE SIGNS LIST 10 vibration damping device
11 first attachment member
12 second attachment member
13 elastic body
14 main liquid chamber
15 subsidiary liquid chamber
16 partition member
30 communicating passage
31, 32, 33, 43, 44 flow-changing protrusion
31a, 32a, 33a flow-changing space
31b, 32b, 33b passing space
31c, 32c, 33c, 43c, 44c passing hole

The invention claimed is:

1. A vibration damping device comprising:
a first tubular attachment member coupled to one of a vibration-generating part and a vibration-receiving part and a second attachment member coupled to the other part;
an elastic body configured to couple the attachment members to each other; and
partition members configured to partition a liquid chamber in the first attachment member in which a liquid is sealed into a first liquid chamber and a second liquid chamber,
wherein at least one of the first liquid chamber and the second liquid chamber has the elastic body as a portion of a wall surface,
a communicating passage configured to communicate the first liquid chamber with the second liquid chamber is provided in the partition members,
flow-changing protrusions being rigid bodies and protruding inward in a radial direction of the communicating passage and configured to change a flow of the liquid flowing in the communicating passage in an axial direction of the communicating passage are provided in an inner circumferential surface of the communicating passage,
the communicating passage and the flow-changing protrusions are formed symmetrically with respect to an axis of the communicating passage when viewed in a longitudinal cross section passing through the axis and the flow-changing protrusions,
projecting ends of the flow-changing protrusions form inner circumferential edges of passing holes which are open toward both sides in the axial direction,
the flow-changing protrusions are rigid bodies, and
a flow-changing protrusion of the flow-changing protrusions is configured to change the flow of the liquid toward a side of the projecting end of the flow-changing protrusion along a surface of the flow-changing protrusion and to turn the liquid about a line extending in a circumferential direction, as a turning axis.

2. The vibration damping device according to claim 1, wherein the flow-changing protrusions partition an inside of the communicating passage into flow-changing spaces formed between the flow-changing protrusions and the inner circumferential surface of the communicating passage and configured to change a flow of the liquid flowing into an inside thereof and passing spaces having the passing holes and through which the liquid flowing into an inside thereof passes.

3. The vibration damping device according to claim 2, wherein the flow-changing protrusions are formed in tubular shapes which extend in the axial direction and in which openings of sides of projecting ends are the passing holes,
the flow-changing spaces are formed between outer circumferential surfaces of the flow-changing protrusions and the inner circumferential surface of the communicating passage, and
the passing spaces are formed by inner circumferential surfaces of the flow-changing protrusions.

4. The vibration damping device according to claim 3, wherein diameters of the outer circumferential surfaces of the flow-changing protrusions are gradually decreased from base ends toward projecting ends.

5. The vibration damping device according to claim 4, wherein a first flow-changing protrusion in which the openings on the sides of the projecting ends faces a side of the first liquid chamber in the axial direction and a second flow-changing protrusion in which the openings on the sides of the projecting ends faces a side of the second liquid chamber in the axial direction are provided as the flow-changing protrusions.

6. The vibration damping device according to claim 3, wherein a first flow-changing protrusion in which the openings on the sides of the projecting ends faces a side of the first liquid chamber in the axial direction and a second flow-changing protrusion in which the openings on the sides of the projecting ends faces a side of the second liquid chamber in the axial direction are provided as the flow-changing protrusions.

7. A vibration damping device comprising:
a first tubular attachment member coupled to one of a vibration-generating part and a vibration-receiving part and a second attachment member coupled to the other part;
an elastic body configured to couple the attachment members to each other; and
partition members configured to partition a liquid chamber in the first attachment member in which a liquid is sealed into a first liquid chamber and a second liquid chamber,
wherein at least one of the first liquid chamber and the second liquid chamber has the elastic body as a portion of a wall surface,
a communicating passage configured to communicate the first liquid chamber with the second liquid chamber is provided in the partition members,
flow-changing protrusions protruding inward in a radial direction of the communicating passage and configured to change a flow of the liquid flowing in the communicating passage in an axial direction of the communicating passage are provided in an inner circumferential surface of the communicating passage,
the communicating passage and the flow-changing protrusions are formed symmetrically with respect to an axis of the communicating passage when viewed in a longitudinal cross section passing through the axis and the flow-changing protrusions,
projecting ends of the flow-changing protrusions form inner circumferential edges of passing holes which are open toward both sides in the axial direction,
the flow-changing protrusions are formed in annular shapes which are open in the axis direction,
the flow-changing protrusions are individually provided at both ends of the communicating passage in the axis direction,
diameters of both ends of the communicating passage in the axis direction are smaller than that of a central portion between both ends of the communicating passage in the axis direction, and
the vibration damping device is configured such that when the liquid passes through the passing hole and flows into the central portion of the communicating passage, part of the liquid flowing along the outside in the radial direction of the communicating passage flows in the axis direction while spreading to the outside in the radial direction along the inner circumferential surface of the central portion.

8. A vibration damping device comprising:
a first tubular attachment member coupled to one of a vibration-generating part and a vibration-receiving part and a second attachment member coupled to the other part;
an elastic body configured to couple the attachment members to each other; and
partition members configured to partition a liquid chamber in the first attachment member in which a liquid is sealed into a first liquid chamber and a second liquid chamber,
wherein at least one of the first liquid chamber and the second liquid chamber has the elastic body as a portion of a wall surface,
a communicating passage configured to communicate the first liquid chamber with the second liquid chamber is provided in the partition members,
flow-changing protrusions protruding inward in a radial direction of the communicating passage and configured to change a flow of the liquid flowing in the communicating passage in an axial direction of the communicating passage are provided in an inner circumferential surface of the communicating passage,
the communicating passage and the flow-changing protrusions are formed symmetrically with respect to an axis of the communicating passage when viewed in a longitudinal cross section passing through the axis and the flow-changing protrusions,
projecting ends of the flow-changing protrusions form inner circumferential edges of passing holes which are open toward both sides in the axial direction,
wherein the flow-changing protrusions are rigid bodies and do not deform due to the flow of the liquid, and
axes of passing holes formed by the flow-changing protrusions and an axis of a communicating passage are coaxial.

* * * * *